(12) United States Patent
Kuo

(10) Patent No.: US 9,187,042 B2
(45) Date of Patent: Nov. 17, 2015

(54) COLLAPSIBLE STEP BAR

(71) Applicant: GOGORO INC., George Town (KY)

(72) Inventor: Sam Shyh-yi Kuo, Guishan Township (TW)

(73) Assignee: GOGORO, Inc., Grand Cayman (KY)

( * ) Notice: Subject to any disclaimer, the term of this patent is extended or adjusted under 35 U.S.C. 154(b) by 0 days.

(21) Appl. No.: 14/554,596

(22) Filed: Nov. 26, 2014

(65) Prior Publication Data
US 2015/0197199 A1  Jul. 16, 2015

Related U.S. Application Data

(60) Provisional application No. 61/910,196, filed on Nov. 29, 2013.

(51) Int. Cl.
*B60R 3/02*  (2006.01)
*B62J 25/00*  (2006.01)

(52) U.S. Cl.
CPC ... *B60R 3/02* (2013.01); *B62J 25/00* (2013.01)

(58) Field of Classification Search
CPC ............ B60R 3/00; B60R 3/007; B60R 3/02; B60J 25/00
See application file for complete search history.

(56) References Cited

U.S. PATENT DOCUMENTS

| | | | | |
|---|---|---|---|---|
| 3,266,594 | A * | 8/1966 | Antosh et al. | 182/91 |
| 3,329,443 | A * | 7/1967 | Lowder et al. | 280/166 |
| 3,734,534 | A * | 5/1973 | Brooks et al. | 280/163 |
| 4,180,143 | A * | 12/1979 | Clugston | 182/91 |
| 6,129,370 | A * | 10/2000 | Hsieh et al. | 280/291 |
| 6,142,499 | A * | 11/2000 | Hsieh et al. | 280/291 |
| 6,893,038 | B2 * | 5/2005 | Egan | 280/291 |
| 7,204,501 | B2 * | 4/2007 | Bang et al. | 280/166 |
| 7,219,911 | B2 * | 5/2007 | Sukonthapanich et al. | 280/166 |
| 7,740,261 | B2 * | 6/2010 | Leitner et al. | 280/166 |
| 8,256,788 | B2 * | 9/2012 | Matsushima et al. | 280/291 |
| 8,827,294 | B1 * | 9/2014 | Leitner et al. | 280/166 |
| 2008/0179859 | A1 * | 7/2008 | Boehmke et al. | 280/291 |
| 2010/0127474 | A1 * | 5/2010 | Jans | 280/291 |
| 2011/0062690 | A1 * | 3/2011 | Kizaki | 280/735 |

* cited by examiner

*Primary Examiner* — Katy M Ebner
*Assistant Examiner* — Emma K Frick
(74) *Attorney, Agent, or Firm* — Perkins Coie LLP

(57) ABSTRACT

A collapsible step bar comprising a step bar body, a bracket, a first link, a second link and a pin is provided. The step bar body comprises a first shaft and a second shaft in a front end of the step bar body. The bracket is disposed adjacent the step bar body. The first link comprises a first end and a second end, and the second link comprises a first end and a second end respectively. Both the first ends of the first link and the second link are pivotably disposed on the bracket, and both the second ends of the first link and the second link are pivotably disposed on the first shaft and the second shaft of the step bar body respectively. The pin pivotably connects to the bracket and the first link for control of a rotation of the first link, such that the step bar body is rotatable into a closed state or an opened state.

4 Claims, 6 Drawing Sheets

COLLAPSIBLE STEP BAR

CROSS-REFERENCE TO RELATED APPLICATION

The present application claims priority to U.S. Provisional Application No. 61/910,196, filed Nov. 29, 2013, which is incorporated herein by reference.

BACKGROUND

1. Technical Field

The present technology relates to a step bar, and more particularly, to a collapsible step bar for a vehicle.

2. Descriptions of the Related Art

Vehicles such as motorcycles and tricycles are usually equipped with step bars for the passenger below the rear seat. Traditional vehicles have their step bars integrally formed on the chassis in consideration of cost-efficiency. However, these step bars are usually not allowed to be formed ergonomically.

An alternative design is to have the step bars pivotably fixed to the frame of a vehicle. Such design may allow the placement of the step bars at a more ergonomic position on the vehicle. However, conventional collapsible step bars are of a "single-axis" structure which requires a reserved space in front of an axis so as to allow the step bars' to rotate to an "open state." As a result, it is impossible for the chassis of the vehicle and the step bar (in a closed state) to form together an integral and smooth appearance. Further, the conventional "single-axis" structure has weaker structural strength.

Accordingly, there is still a need in the art to provide a step bar which allows smooth integration into the overall appearance of a vehicle and at the meantime has an improved structural strength.

SUMMARY

The present technology provides a step bar comprising a step bar body, a bracket, a first link, a second link, and a pin. The step bar body comprises a first shaft and a second shaft in a front end of the step bar body. The bracket is disposed adjacent to the step bar body. The first link comprises a first end and a second end; the second link also comprises a first end and a second end. Both the first ends of the first link and the second link are pivotably disposed on the bracket, and the second ends of the first link and the second link are pivotably disposed on the first shaft and the second shaft of the step bar body respectively. The pin pivotably connects to the bracket and the first link for control of a rotation of the first link, such that the step bar body is rotatable into a closed state or an open state.

In certain preferred embodiments of the present technology, the step bar further comprises a first spring disposed on the pin for providing a force for the rotation of the pin and the first link. In certain embodiments, the step bar of the present technology further comprises a locking member operably disposed on the pin. When the locking member is in a first position, it is adapted to restrict the rotation of the pin. When the locking member is in a second position, it is adapted to allow the rotation of the pin by the first spring.

In one embodiment of the present technology, the locking member comprises a through hole for receiving a locking end of the pin. The through hole has a round end and a rectangular end. The locking end of the pin has a rectangular cross-sectional shape corresponding to the rectangular end of the through hole. Accordingly, when the locking member is in the first position, the locking end is received in the rectangular end of the through hole. When the locking member is in the second position, the locking end is received in the round end of the through hole. In one further embodiment, the step bar further comprises a contraction member and a second spring which are used to move the locking member to the first or the second position. In one still further embodiment, the step bar further comprises a case for accommodating the contraction member and the second spring.

According to another embodiment of the present technology, the step bar may further comprise a damper disposed on the pin, for control of the opening speed of the step bar body.

The detailed technology and preferred embodiments implemented for the subject invention are described in the following paragraphs accompanying the appended drawings for people skilled in this field to well appreciate the features of the claimed invention.

DETAILED DESCRIPTION

Figure 1:
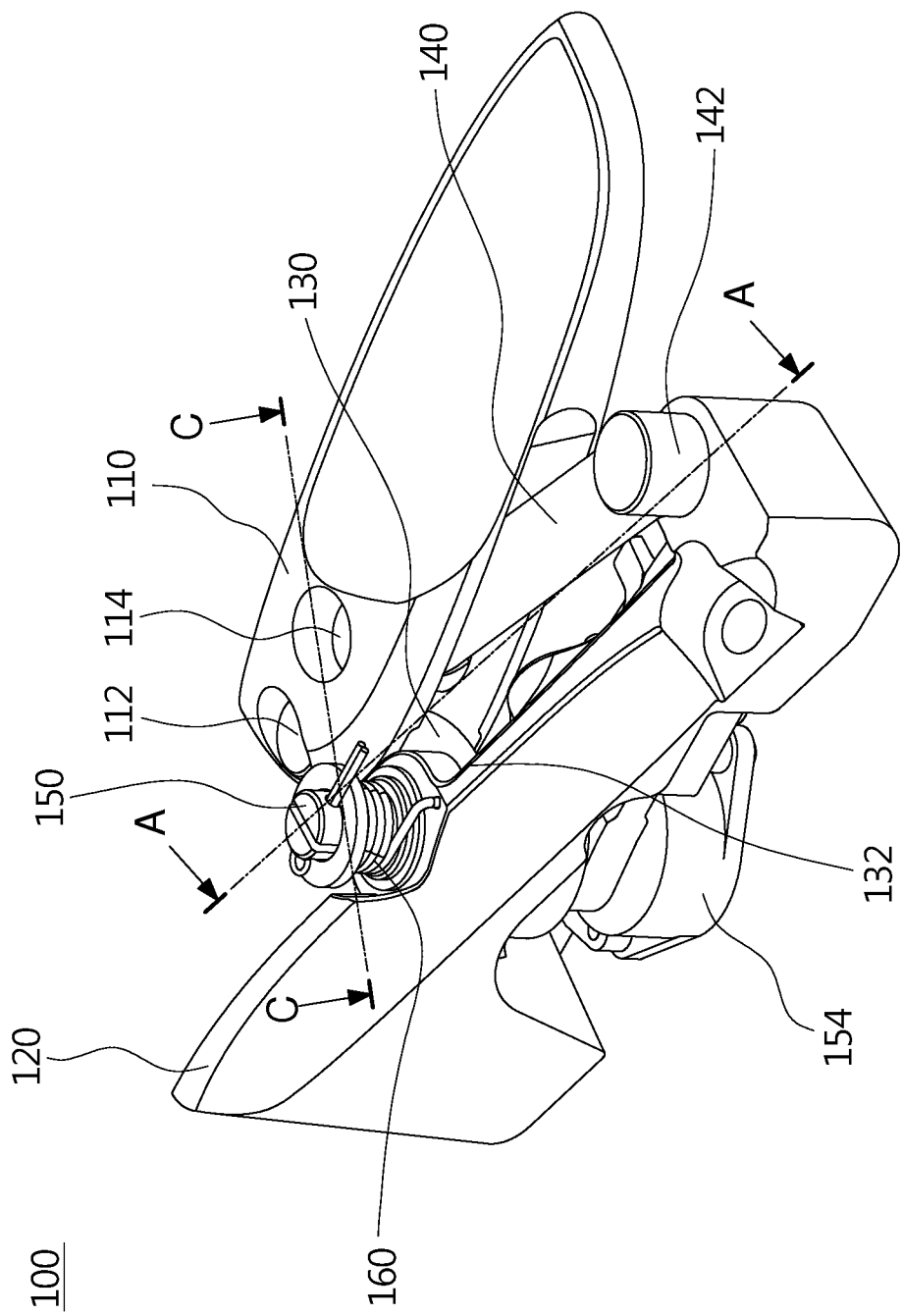
FIG. 1 is a schematic view illustrating a step bar of the present technology in a closed state.

Referring to FIG. 1, a step bar 100 of the present technology is provided. The step bar 100 comprises a step bar body 110, a bracket 120, a first link 130, a second link 140, and a pin 150.

Specifically, the step bar body 110 is configured with a first shaft 112 and a second shaft 114 at a front end of the step bar body, and the bracket 120 is disposed adjacent to the step bar body 110. The first link 130 has a first end 132 and a second end 134, and similarly, the second link 140 has a first end 142 and a second end 144. The first end 132 of the first link 130 and the first end 142 of the second link 140 are pivotably disposed on the bracket 120. On the other hand, the second end 134 of the first link 130 and the second end 144 of the second link 140 are pivotably disposed on the first shaft 112 and the second shaft 114 of the step bar body 110 respectively. Further, the pin 150 pivotably connects to the bracket 120 and the first link 130,such that when the first link 130 is rotated, the step bar body 110 can change between a closed state as shown in FIG. 1 and an opened state as shown in FIG. 2.

Figure 2:
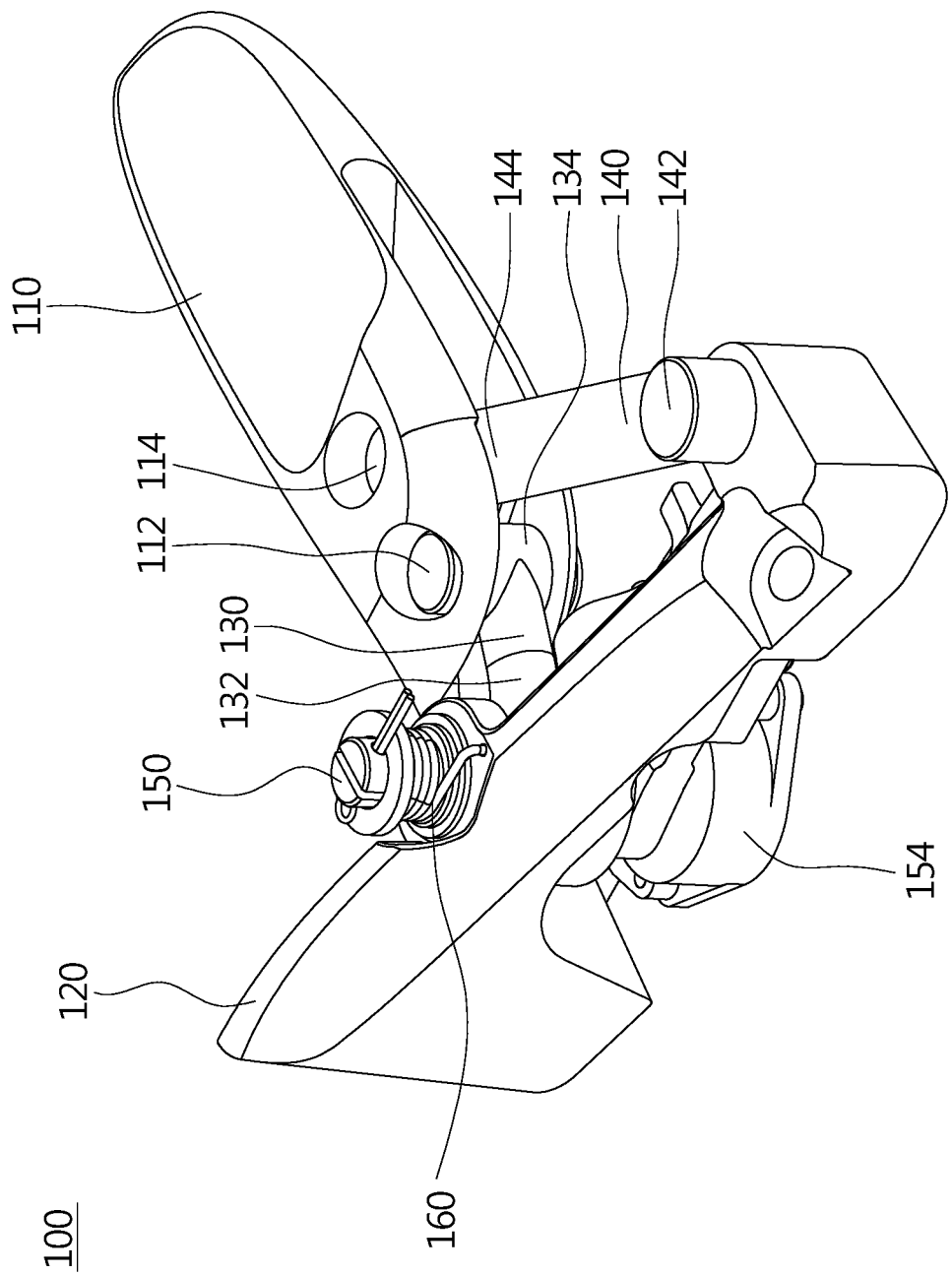
FIG. 2 is a schematic view illustrating a step bar of the present technology in an opened state.

With reference to both FIG. 1 and FIG. 2, in one preferred embodiment of the present technology, a first spring 160 is disposed on the pin 150 for providing a torsion force for rotation of the first link 130. Accordingly, when the pin 150 is driven by the first spring 160, the first link 130 is driven by the pin 150 to rotate with respect to the pin 150 clockwise by a certain angle, and thereby the step bar body 110 can change from the closed state shown as in FIG. 1 to the opened state shown as in FIG. 2, allowing a passenger to place his foot thereon.

Figure 3:
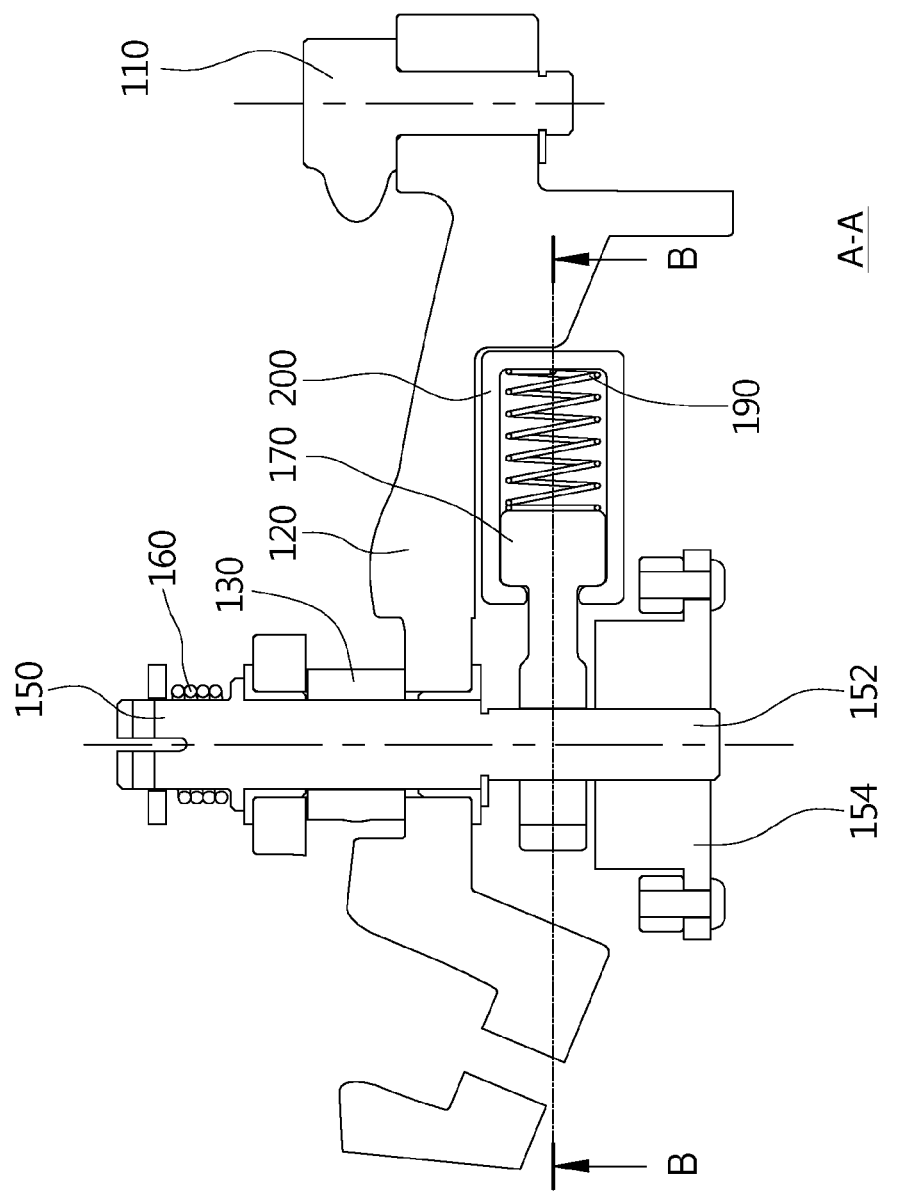
FIG. 3 is a cross-sectional view of the step bar of FIG. 1 taken along line A-A.
Figure 4:
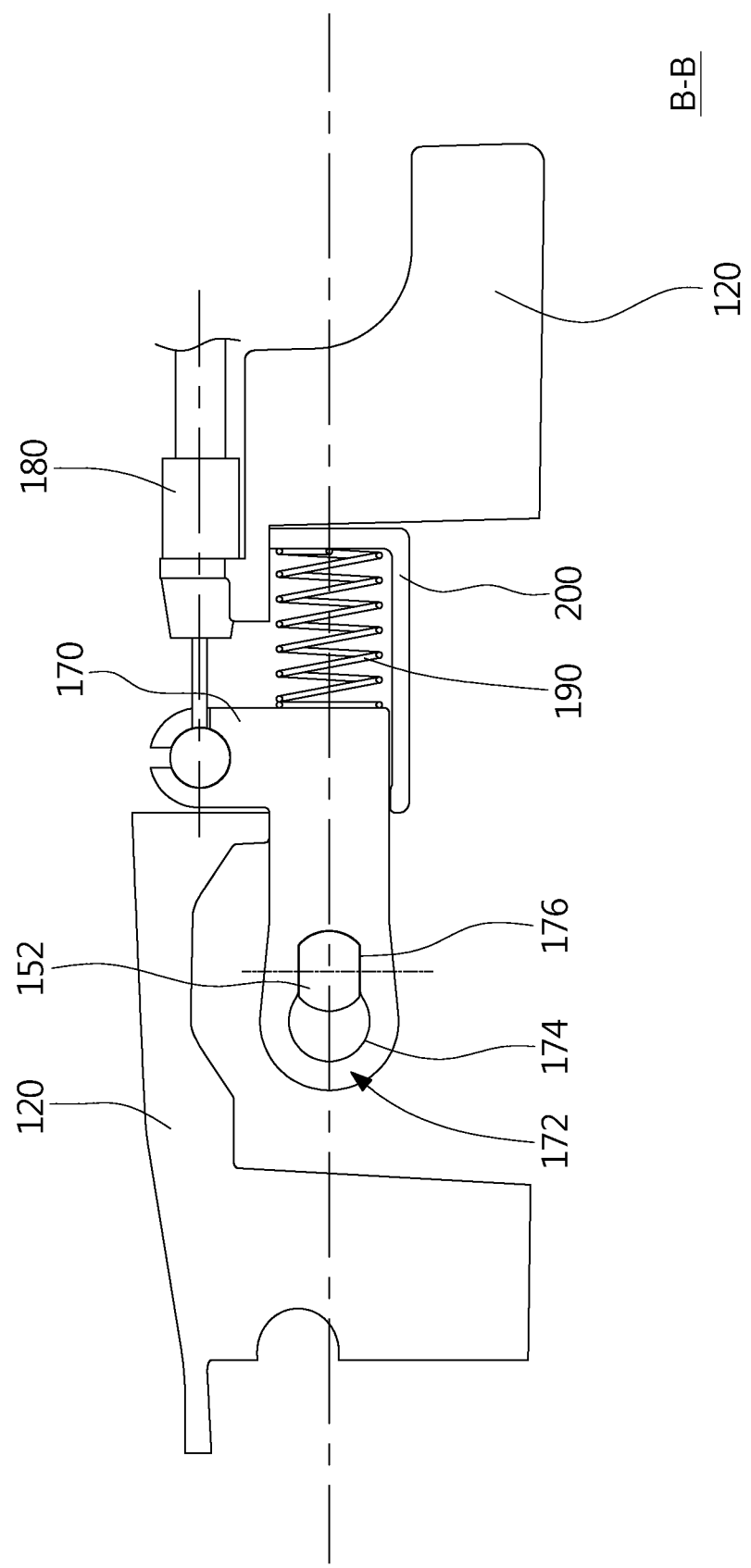
FIG. 4 is a cross-sectional view taken along line B-B of FIG. 3 (step bar in closed state)

Please refer to FIG. 3 showing a cross-sectional view of the step bar 100 taken along line A-A of FIG. 1. To control the change of the step bar body 110 from the closed state to the opened state through a central control system (not shown), a locking member 170 is disposed below the step bar body 110, the bracket 120, the first link 130, and the second link 140, and operably disposed on the pin 150. When the locking member 170 is in a first position as shown in FIG. 4, it is adapted to restrict the rotation of the pin 150. When the locking member 170 is in a second position as shown in FIG. 5, it is adapted to allow the rotation of the pin 150 by the first spring 190, such that the first link 130 can rotate and the step bar body 110 can change from the closed state to the opened state.

The relationship between the locking member 170 and the pin 150 will be further described below.

Figure 5:
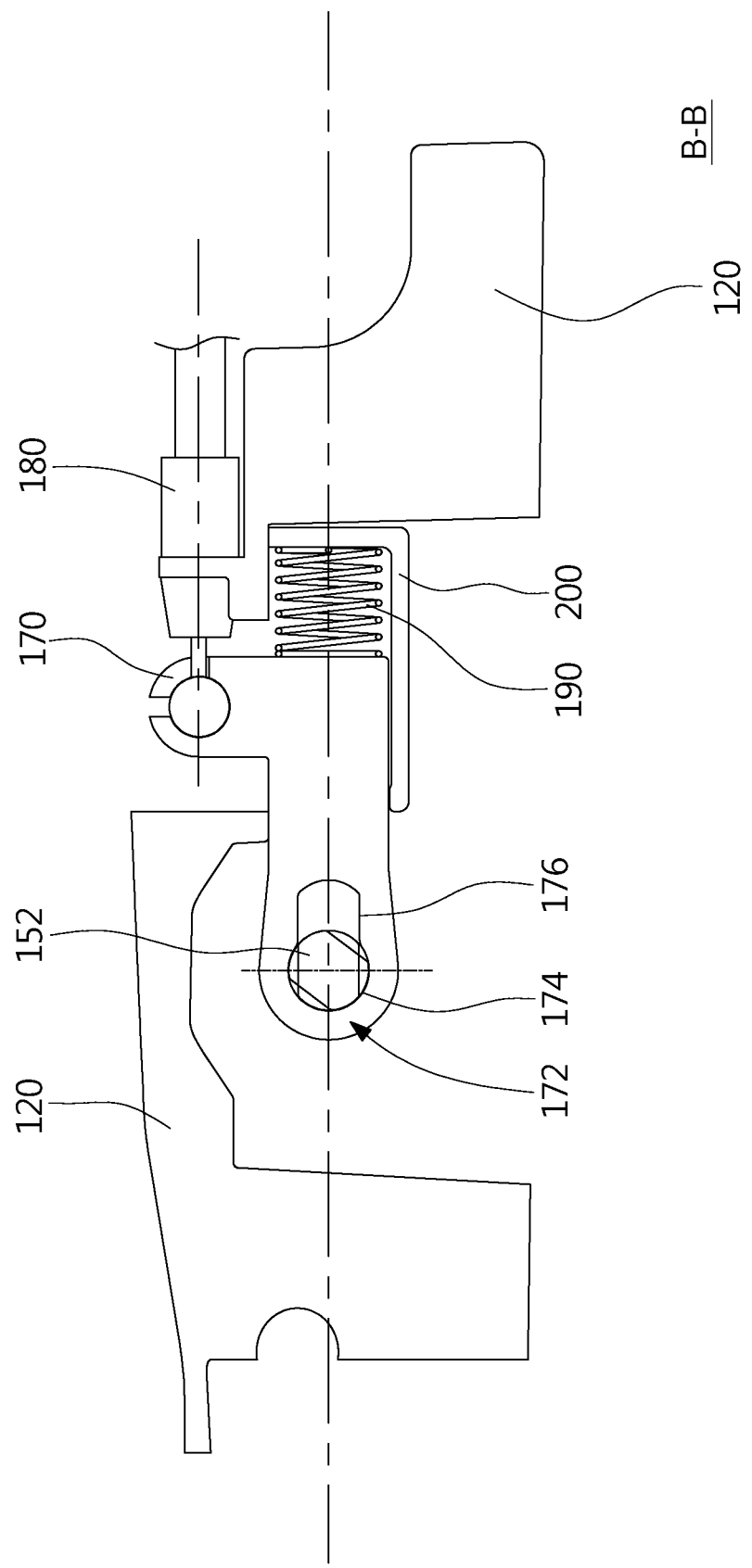
FIG. 5 is a cross-sectional view taken along line B-B of FIG. 3 (step bar in opened state)

Referring to both FIG. 4 and FIG. 5, in some preferred embodiments of the present technology, the locking member 170 comprises a through hole 172 for receiving a locking end 152 of the pin 150. The though hole 172 and the locking end 152 are adapted to restrict the rotation of the pin 150 when the locking member 170 is in the first position. In one embodiment, the through hole 172 has a round end 174 and a rectangular end 176. The locking end 152 of the pin 150 has a substantially rectangular cross-sectional shape corresponding to the rectangular end 176 of the through hole 172, such that when the locking member 170 is in the first position as shown in FIG. 4, the locking end 152 is received in the rectangular end 176 and thus the rotation of the pin 150 is restricted. When the locking member 170 is displaced by a force to the second position (e.g., to the right) as shown in FIG. 5, the locking end 152 is received in the round end 174, such that the pin 150 can be rotated as driven by the first spring 190, and the first link 130 can rotate by a certain angle and the step bar body 110 can transform from the closed state to the opened state.

In addition, the step bar 100 may further comprise a contraction member 180 and a second spring 190 which are used to move the locking member 170 to the first or the second position. The contraction member 180 may receive a signal from a central control system (no shown) and provide a force to displace the locking member 170 to the second position (e.g., to the right) as shown in FIG. 5. The contraction member 180 preferably includes a wire, but is not limited thereto. The second spring 190 is disposed between the locking member 170 and the bracket 120 for providing a force opposite to that from the contraction member 180, and for pushing the locking member (e.g., to the left) to the first position as shown in FIG. 4. A case 200 may be further included for accommodating the contraction member 180 and the second spring 190.

Figure 6:
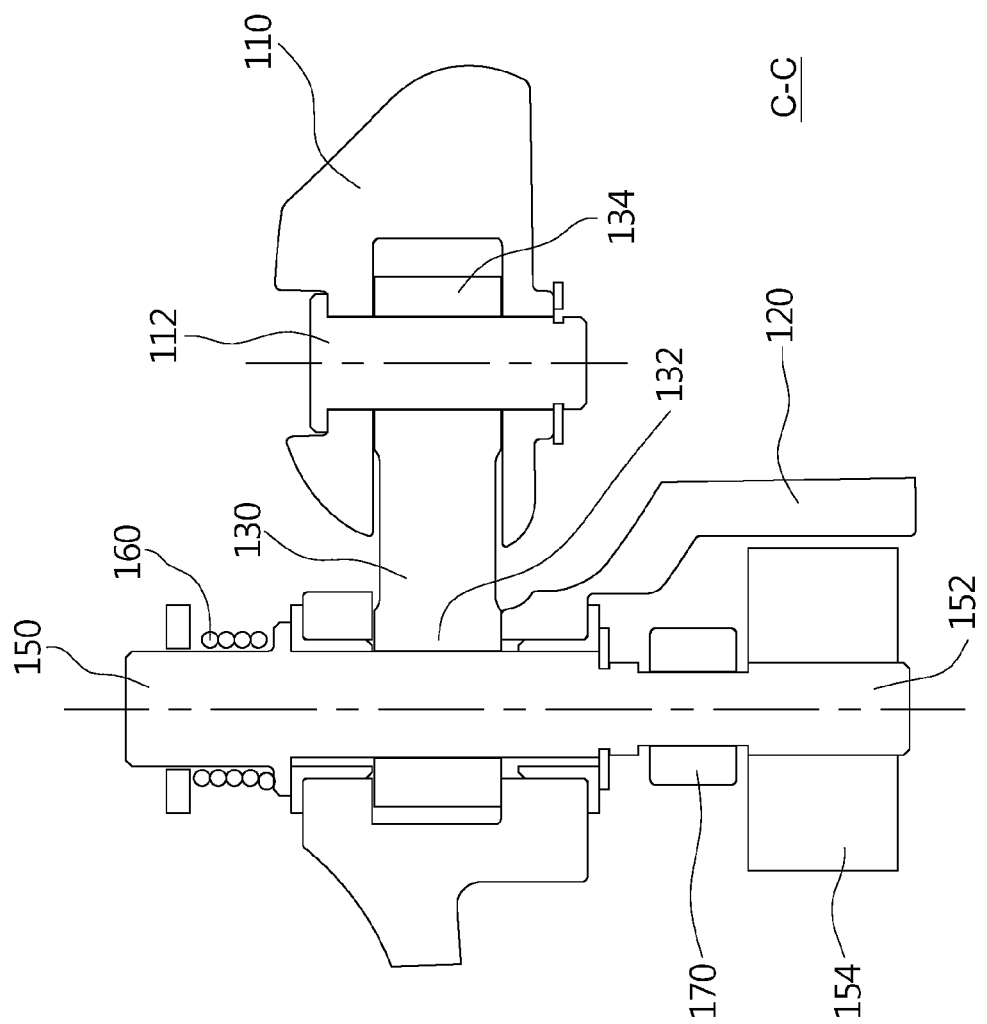
FIG. 6 is a cross-sectional view of the step bar of FIG. 1 taken along line C-C.

FIG. 6 shows a cross-sectional view of the step bar 100 taken along line C-C of FIG. 1. Referring to FIGS. 1 and 6, the step bar 100 may further comprise a damper 154 disposed on the pin 150. Accordingly, when the locking end 152 of the pin 150 is received in the round end 174, which allows the pin 150 to rotate as the pin 150 is driven by the first spring 160. The damper 154 can slow down the rotation of the pin 150, so as to control the rotation speed of the step bar body 110.

The step bar 100 of the present technology comprises a four-link structure consisting of the step bar body 110, the bracket 120, the first link 130 and the second link 140, and therefore, the step bar 100 has an improved structural strength as compared to a conventional collapsible step bar. Furthermore, with the above-mentioned four-link structure, the step bar body 110 can be fully and smoothly integrated into the overall appearance of a vehicle when collapsed.

What is claimed is:
1. A step bar, comprising:
a step bar body comprising a first shaft and a second shaft, the first and second shafts being disposed in a front end of the step bar body;
a bracket disposed adjacent the step bar body;
a first link having a first end and a second end, and a second link having a first end and a second end, wherein both the first ends of the first and second links are pivotably disposed on the bracket and the second ends of the first and second links are pivotably disposed on the first shaft and the second shaft respectively;
a pin pivotably connecting to the bracket and the first link for control of a rotation of the first link, such that the step bar body is rotable into an opened or closed state;
a first spring disposed on the pin for providing a force for the rotation of the pin and the first link; and
a locking member operably disposed on the pin, wherein when the locking member is in a first position, the locking member is adapted to restrict the rotation of the pin; and when the locking member is in second position, the locking member is adapted to allow the rotation of the pin by the first spring,
wherein the locking member comprises a through hole for receiving a locking end of the pin, the through hole having a round end and a rectangular end, and the locking end of the pin having a rectangular cross-sectional shape corresponding to the rectangular end of the through hole, wherein when the locking member is in the first position, the locking end is received in the rectangular end; and when the locking member is in the second position, the locking end is received in the round end.

2. The step bar of claim 1, further comprising a contraction member and a second spring which are used to move the locking member the first or the second position.

3. The step bar of claim 2, further comprising a case for accommodating the contraction member and the second spring.

4. The step bar of claim 1, further comprising a damper disposed on the pin.

* * * * *

UNITED STATES PATENT AND TRADEMARK OFFICE
CERTIFICATE OF CORRECTION

| | | |
|---|---|---|
| PATENT NO. | : 9,187,042 B2 | Page 1 of 1 |
| APPLICATION NO. | : 14/554596 | |
| DATED | : November 17, 2015 | |
| INVENTOR(S) | : Kuo | |

It is certified that error appears in the above-identified patent and that said Letters Patent is hereby corrected as shown below:

On the title page item [57] line 4, delete "adjacent" and insert -- adjacent to --, therefor.

In the specification

Column 2, line 51, delete "130,such" and insert -- 130, such --, therefor.

In the claims

Column 4, line 12, claim 1, delete "bar," and insert -- bar --, therefor.

Column 4, line 17, claim 1, delete "adjacent" and insert -- adjacent to --, therefor.

Column 4, line 26, claim 1, delete "rotable" and insert -- rotatable --, therefor.

Column 4, line 32, claim 1, delete "is in" and insert -- is in a --, therefor.

Signed and Sealed this
Tenth Day of May, 2016

Michelle K. Lee
*Director of the United States Patent and Trademark Office*